United States Patent
Jiang et al.

(10) Patent No.: US 10,599,339 B2
(45) Date of Patent: Mar. 24, 2020

(54) SEQUENTIAL WRITE MANAGEMENT IN A DATA STORAGE SYSTEM

(71) Applicant: INTERNATIONAL BUSINESS MACHINES CORPORATION, Armonk, NY (US)

(72) Inventors: Liang J. Jiang, Austin, TX (US); Anil Kalavakolanu, Austin, TX (US); Brian W. Hart, Austin, TX (US); Vani D. Ramagiri, Austin, TX (US); Tao Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/049,694

(22) Filed: Jul. 30, 2018

(65) Prior Publication Data

US 2020/0034039 A1 Jan. 30, 2020

(51) Int. Cl.
| | |
|---|---|
| *G06F 12/00* | (2006.01) |
| *G06F 13/00* | (2006.01) |
| *G06F 3/06* | (2006.01) |
| *G06F 12/10* | (2016.01) |
| *G11B 20/12* | (2006.01) |

(52) U.S. Cl.
CPC ............ *G06F 3/061* (2013.01); *G06F 3/0659* (2013.01); *G06F 3/0676* (2013.01); *G06F 12/10* (2013.01); *G11B 20/1217* (2013.01); *G06F 2212/1008* (2013.01); *G06F 2212/21* (2013.01); *G11B 2020/1238* (2013.01)

(58) Field of Classification Search
CPC .......... G06F 11/1402; G06F 2212/621; G06F 3/061; G06F 3/0659; G06F 3/0676
See application file for complete search history.

(56) References Cited

U.S. PATENT DOCUMENTS

| | | | |
|---|---|---|---|
| 6,275,885 B1 * | 8/2001 | Chin | G06F 12/0831 710/125 |
| 7,406,571 B2 * | 7/2008 | Harada | G06F 12/0835 711/146 |
| 7,490,212 B2 | 2/2009 | Kasiraj et al. | |
| 8,266,331 B2 * | 9/2012 | Freking | G06F 13/36 370/381 |
| 8,510,504 B2 | 8/2013 | Coker et al. | |
| 9,201,731 B2 | 12/2015 | Burd et al. | |

(Continued)

*Primary Examiner* — Sean D Rossiter
(74) *Attorney, Agent, or Firm* — William K. Konrad; Konrad Raynes Davda & Victor LLP

(57) ABSTRACT

Sequential write management in accordance with the present description permits impermissible write retries to be processed by a hard drive such as a Shingled Magnetic Recording (SMR) hard dive. In one embodiment, logic returns a successful write indication in response to a received retry write request operation without writing data to the SMR hard drive if the data of the received retry write operation has already been successfully written to the same location requested by the received retry write request operation. Conversely, a failure notice is returned if the data of the received retry write request operation has not been previously successfully written to the same location requested by the received retry write request operation. Other features and aspects may be realized, depending upon the particular application.

24 Claims, 8 Drawing Sheets

(56) References Cited

U.S. PATENT DOCUMENTS

| | | | |
|---|---|---|---|
| 9,431,056 B2 | 8/2016 | Pantel | |
| 9,471,422 B2 * | 10/2016 | DeBrosse | G11C 11/4076 |
| 9,870,281 B1 * | 1/2018 | Gosla | G11B 20/10527 |
| 9,972,353 B1 * | 5/2018 | Qiang | G11B 20/1217 |
| 2011/0075292 A1 | 3/2011 | New et al. | |
| 2014/0101515 A1 | 4/2014 | Akiyama et al. | |
| 2014/0164881 A1 * | 6/2014 | Chen | G11C 16/00 714/773 |
| 2017/0160771 A1 * | 6/2017 | Albrecht | G06F 1/206 |
| 2017/0322844 A1 | 11/2017 | Hong et al. | |
| 2017/0345456 A1 | 11/2017 | Hassner et al. | |

* cited by examiner

PRIOR WRITE POINTER VALUE (1234) AND
PRIOR WRITE OPERATION STARTING
LOCATION (1234)

PRIOR WRITE OPERATION
DATA COUNT (8 blocks)

FIG. 9A

ZONE BLOCK ADDRESS

MAINTAINED PRIOR
POINTER VALUE (1234) DOES
NOT MATCH COMMAND
STARTING LOCATION (1242)

CURRENT WRITE POINTER VALUE (1242)
MATCHES CURRENT COMMAND STARTING
LOCATION (1242)

PRIOR WRITE POINTER VALUE (1234) AND
PRIOR WRITE OPERATION STARTING
LOCATION (1234)

COUNT

FIG. 9B

MAINTAINED PRIOR
POINTER MATCHES
COMMAND STARTING
LOCATION

CURRENT WRITE POINTER VALUE (1242)
DOES NOT MATCH CURRENT COMMAND
STARTING LOCATION (1234)

STARTING
LOCATION

COUNT

FIG. 9C

MAINTAINED PRIOR
POINTER MATCHES
COMMAND STARTING
LOCATION

MAINTAINED POINTER
WITHIN COMMAND COUNT
RANGE

SEQUENTIAL WRITE MANAGEMENT IN A DATA STORAGE SYSTEM

BACKGROUND OF THE INVENTION

1. Field of the Invention

The present invention relates to a computer program product, system, and method for sequential write management in data storage systems.

2. Description of the Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

Various technologies such as Fibre Channel or Internet Protocol (IP) based networks are employed for communication among the various components of a data system including the hosts, storage controller and storage units. However, it is recognized that notwithstanding the particular technology used for communication between the data system components, communication errors between various data system components can nonetheless occur.

A data storage unit is a device capable of storing data, such as physical hard disk drives, solid state drives, tape drives, etc. One known hard disk drive technology employs a Shingled Magnetic Recording (SMR) technology which overlaps wide "write" tracks in a manner akin to rows of roofing shingles. By comparison, read operations read data from a narrow central band of the track that's not overlapped. One consequence of overlapping write tracks in an SMR hard drive is that write operations are required to be sequential in many if not all SMR hard drives. More specifically, SMR drives are typically partitioned into zones, and within any one zone, the write operations directed to that zone are required to be sequential, that is, ordered from start to end of the zone with no gaps or back-tracking or re-writing of previously written tracks.

Accordingly, SMR drives typically maintain a write pointer for each zone which is incremented after each successful write operation to a storage location within the same zone, to point to the next-in-sequence write location of that zone of the SMR drive. Upon receipt of the next write request operation, the data will be written to that next-in-sequence write location of that zone of the SMR drive. In this manner, data is written in order in each zone from start to end of the zone with no gaps or back-tracking or re-writing of previously written tracks.

SUMMARY

One general aspect of a computing environment employing sequential write management in accordance with the present description, is directed to use with a host, storage controller and a data storage unit such as an SMR drive having a storage protocol requiring data to be written sequentially. In one embodiment, sequential write management in accordance with the present description, provides a substantial improvement to the operations of a computer system having a sequential data storage unit such as an SMR drive. For example, existing error handling routines of an input/output (I/O) requestor such as a host may be utilized without modification to accommodate restrictive storage protocols of SMR drives. Moreover, retry write operations which cannot be executed by an existing SMR drive can nonetheless be processed by logic employing sequential write management in accordance with the present description. For example, sequential write management logic provides a success/failure notification to the I/O requestor depending upon whether the prior write operation was successful instead of simply rejecting a currently received write request operation determined to be an impermissible retry write request operation of a previously executed write operation.

In one embodiment of sequential write management in accordance with the present description, logic determines whether a received write request operation is a retry write request operation of a previous write request operation to write to the same location of the previous write request operation. Such retry operations are typically not permitted by storage protocols of hard drives such as SMR drives which require data to be written sequentially.

In response to a determination that the received write request operation is an impermissible retry write request operation of a previous write request operation, logic determines if the data of the previous write request operation has previously been successfully written to the same location of the received write request operation. If so, logic bypasses execution of the received write request operation and instead returns a successful write indication in response to the received write request operation without executing the received write request operation. Conversely, in response to a determination that the data of the previous write request operation has not been previously successfully written to the same location of the received write request operation, logic again bypasses execution of the received write request operation and returns instead a write failure indication without executing the received write request operation.

Thus, in either case, logic bypasses execution of the received write request operation because an impermissible write retry request cannot be executed by a typical SMR drive. However, by providing a success/failure notification in response to the currently received write request operation instead of simply rejecting execution of the currently received write request operation, the existing error handling routines of an I/O requestor such as a host may be utilized without modification to accommodate the restrictive storage protocols of SMR drives or other drives in which data is written sequentially without gaps or backtracking to prior sequential locations.

Implementations of the described techniques may include hardware, a method or process, or computer software on a computer-accessible medium. Other features and aspects may be realized, depending upon the particular application.

BRIEF DESCRIPTION OF THE DRAWINGS

FIGS. 8A-8C and 9A-9C are graphs depicting usage of write pointers in examples of operations of a data storage device of the computing environment of FIG. 1, employing sequential write management in accordance with one aspect of the present description.

DETAILED DESCRIPTION

Figure 1:
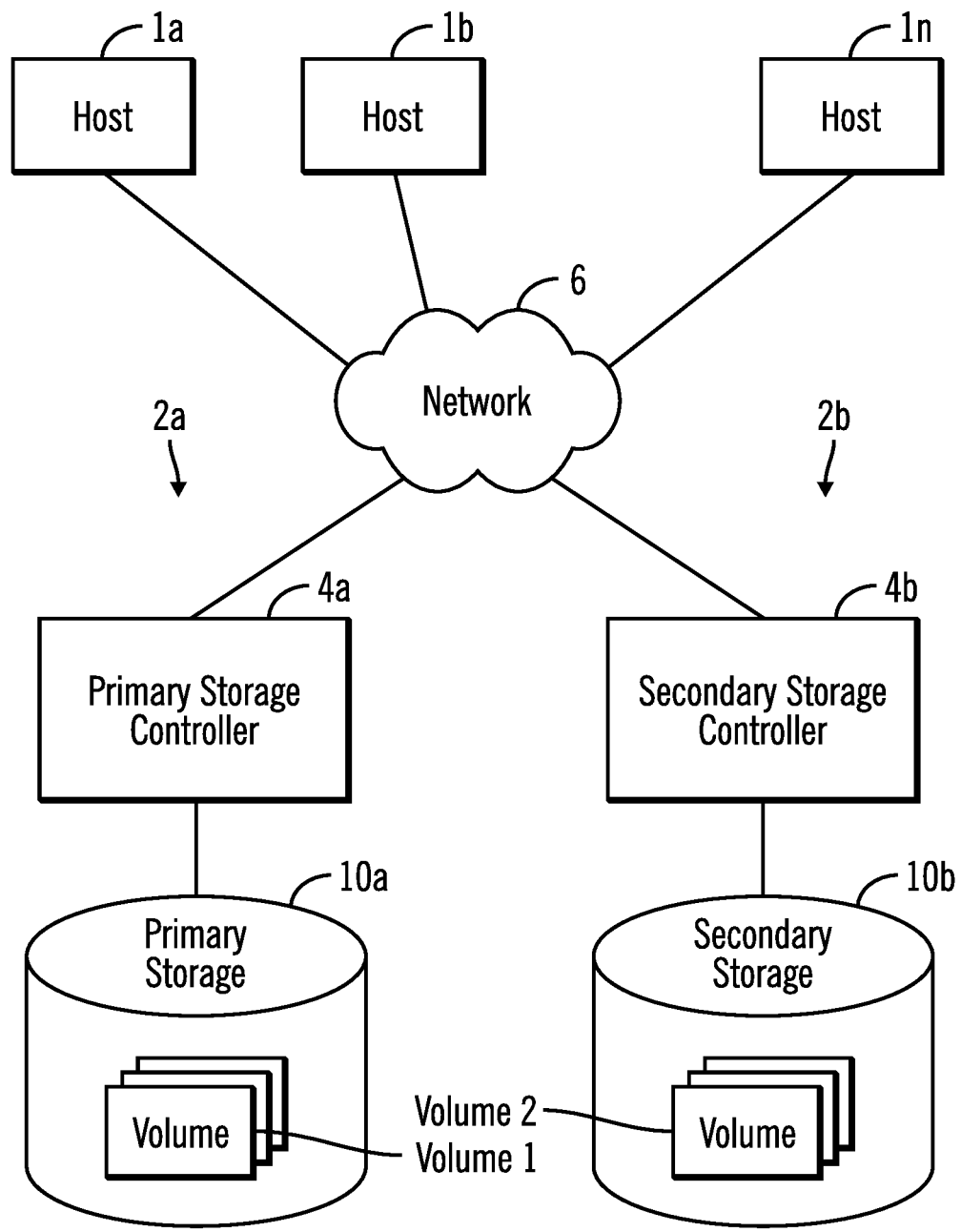
FIG. 1 illustrates an embodiment of a computing environment employing sequential write management in a data storage system in accordance with one aspect of the present description.

Sequential write management in accordance with the present description provides a significant improvement in computer technology. For example, existing error handling routines of an I/O requestor such as a host may be utilized without modification to accommodate the restrictive storage protocols of SMR drives. As another example, retry write request operations previously not executable by SMR drives are nonetheless processed by logic of an SMR drive employing sequential write management in accordance with the present description. For example, sequential write management logic provides a success/failure notification to the I/O requestor depending upon whether the prior write operation was successful instead of simply rejecting a currently received write request operation determined to be an otherwise impermissible retry write request operation of a previously executed write operation.

As set forth above, SMR drives are typically partitioned into zones, and within any one zone, the write operations directed to that zone typically are required to be sequential, that is, ordered from start to end of the zone with no gaps or back-tracking or re-writing of previously written tracks. Accordingly, a restrictive storage protocol may be implemented in an attempt to conform write operations to these sequential write requirements of SMR drives. However, it is appreciated herein that this requirement in SMR drives for sequential writing within each zone can cause problems for SMR drives attached to a storage controller and host via a less than perfectly reliable communications medium such as a Fibre Channel or IP-based network in prior data storage systems.

For example, an error in communications between a host in a prior data storage system requesting a write operation and the SMR drive to which the write request operation is directed, may cause the host to request an impermissible rewrite of a prior write operation notwithstanding that the prior write request operation was previously successfully executed by the SMR drive. Thus, the I/O request source unaware of the prior successful write operation, in renewing the I/O request is effectively requesting a rewrite of the prior successfully written data. Such a rewrite operation will not be permitted by the SMR storage protocol which requires all write operations within a particular zone to be ordered from start to end of the zone with no gaps or back-tracking or re-writing of previously written tracks. As a result, the requested retry write operation causes a storage protocol failure for prior SMR drives.

An example of such an error in communications is a dropped Small Computer System Interface (SCSI) Completion message from the SMR drive in which the SMR drive attempted to inform the storage controller or host of the successful completion of a requested write operation to the SMR drive attached to the storage controller. In this example, the host may have initially requested a write of 8 blocks of data, for example, to a logical block address such as "1234," for example, which is mapped to storage location in a zone of an SMR drive attached to the storage controller. The initial write request includes or references the 8 blocks of data to be written.

Upon successful completion of the writing of the 8 blocks of data to the storage location "1234" of the zone of the SMR drive, the SMR drive increments a write pointer for that zone to point to the next-in-sequence storage location "1242" (1234+8=1242) and attempts to report the successful completion of the requested write operation. However, due to a communication error, the completion message is dropped either between the SMR drive and the storage controller, or between the storage controller and the host. Failing to receive either a write completion message or a write failure message, the host typically would retry the write request, requesting writing of the same 8 blocks of data to the same storage location of the prior write operation, that is, storage location "1234" mapped to the SMR drive.

However, prior SMR drives typically cannot successfully process a retry of a successfully executed prior write operation. After the successful completion of the prior write operation by the SMR drive, the write pointer will have been advanced by the SMR drive 8 block locations to point to block 1242 which is at that time, the only block address to which the SMR can write. It cannot back-track to re-write at block address 1234.

Sequential write management in accordance with the present description permits such otherwise impermissible write retries to be processed by the SMR drive without actually writing data. In one embodiment of sequential write management in accordance with the present description, logic determines whether a received write request operation is a retry write request operation of a previous write request operation to write to the same location of the previous write request operation. As noted above, such retry operations are typically not permitted by storage protocols of hard drives such as SMR drives which require data to be written sequentially.

In response to a determination that the received write request operation is an otherwise impermissible retry write request operation of a previous write request operation, logic determines if the data of the previous write request operation has previously been successfully written to the same location of the received write request operation. If so, logic bypasses execution of the received write request operation and instead returns a successful write indication in response to the received write request operation without writing data to the SMR hard drive. Conversely, in response to a determination that the data of the previous write request operation has not been previously successfully written to the same location of the received write request operation, logic again bypasses execution of the received write request operation and returns instead a write failure indication without writing data to the SMR hard drive. Thus, in either case, logic bypasses execution of the received write operation because a write retry request cannot be executed by a typical SMR drive. However, by providing a success/failure notification in response to the currently received write request operation instead of executing the currently received write request operation, the existing error handling routines of an I/O requestor such as a host may be utilized without modification to accommodate the storage protocols of SMR drives or other drives in which data is written sequentially without gaps or backtracking to prior sequential locations.

Implementations of the described techniques may include hardware, a method or process, or computer software on a computer-accessible medium. A system of one or more computers may be configured for sequential write management in a data storage system in accordance with the present description, by virtue of having software, firmware, hardware, or a combination of them installed on the system that in operation causes or cause the system to perform sequential write management in accordance with the present description. For example, one or more computer programs may be configured to perform sequential write management in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

FIGS. 1-4 illustrate an embodiment of a computing environment employing sequential write management in a data storage system in accordance with the present description. A plurality of hosts $1a$ (FIGS. 1, 3), $1b$ . . . $1n$ may submit Input/Output (I/O) requests over a network 6 to one or more data storage devices or systems $2a$, $2b$, to read or write data. The hosts $1a$, $1b$ . . . $1n$ may be separate physical devices or may be virtual devices implemented using assigned resources of partitions of a server, for example. In a similar manner, the data storage systems $2a$, $2b$ may be separate physical devices or may be virtual devices implemented using assigned resources of partitions one or more servers, for example.

In the illustrated embodiment, the data storage system $2a$ is a primary data storage system and the data storage system $2b$ is a secondary data storage system in which data stored on the primary data storage system $2a$ by a host is mirrored to the secondary data storage system $2b$. Although the embodiment depicted in FIG. 1 depicts a single secondary data storage system $2b$, it is appreciated that a primary data storage system $2a$ may have more than one secondary data storage system.

Figure 2:
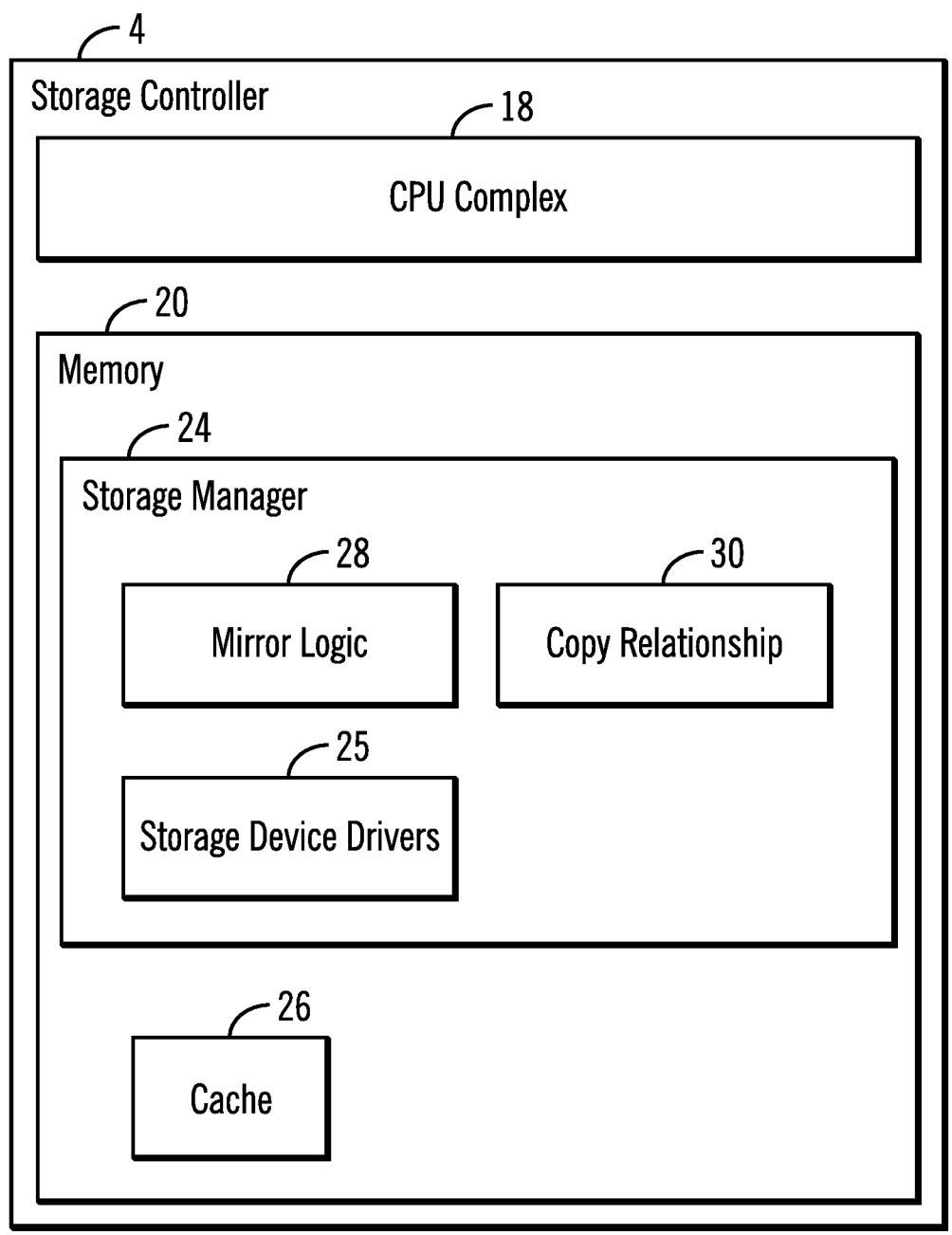
FIG. 2 illustrates an example of a storage controller of the computing environment of FIG. 1.

Each data storage system $2a$, $2b$ includes a storage controller or control unit $4a$, $4b$, respectively, an example of which is shown in greater detail in FIG. 2 as storage controller 4, which accesses data stored in multiple data storage units of storage $10a$, $10b$, respectively. In the illustrated embodiment each of the data storage units $10a$, $10b$ include one or more SMR hard drives. It is appreciated that one or more other data storage units of the storage $10a$, $10b$ may further comprise any suitable device capable of storing data, such as non-SMR hard drives, solid state drives, tape drives, etc., known in the art. Thus, in one embodiment, the storage $10a$, $10b$ may be further comprised of one or more sequential access storage devices, such as hard disk drives and magnetic tape drives or may also include non-sequential access storage devices such as solid state drives (SSD), for example. Such additional devices of storage $10a$, $10b$ may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage $10a$, $10b$ may also be other types of storage such as solid state drives in a RAID configuration to facilitate data recovery in the event of loss of a solid state drive. The storage units of the storage $10a$, $10b$ may be configured to store data in subunits of data storage such as volumes, tracks, etc.

Each storage controller 4 (FIG. 2), $4a$, $4b$ includes a CPU complex 18 (FIG. 2) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a, 4b further has a memory 20 that includes a storage manager 24 configured to manage storage operations including writing data to or reading data from a storage unit of an associated storage 10a, 10b in response to an I/O data request from a host or mirrored data from another data storage system. The storage manager 24 includes appropriate storage device drivers 25 to configure associated storage 10a, 10b.

A cache 26 of the memory 20 may comprise one or more of different types of memory, such as RAMs, write caches, read caches, non-volatile storage (NVS), etc. The different types of memory that comprise the cache may interoperate with each other. The CPU complex 18 of each storage controller 4 (FIG. 2), 4a, 4b may have multiple clusters of processors, each cluster having its own assigned memory 20, storage manager 24, cache, etc. The processing and memory resources assigned each cluster may be physical, virtual, shared, transferrable or dedicated, depending upon the particular application.

In the illustrated embodiment, the storage manager 24 includes mirror logic 28 that is configured to execute in the primary storage controller 4a (FIG. 1) and perform copy operations to copy tracks or other portions of storage volumes from the primary storage controller 4a to the secondary storage controller 4b in a consistent manner. For example, a primary-secondary pair of volumes, volume1, volume2 are in an asynchronous copy or mirror relationship 30 such that updates to the primary volume1 are asynchronously mirrored to each secondary volume2.

In the illustrated embodiment, a copy relationship is represented by a data structure as represented by the copy relationships 30 of the memory 20 of FIG. 2. Thus, one or more copy relationships 30, which may be maintained by the mirror logic 28 for the primary and secondary storage controllers 4a, 4b, (FIG. 1) associate primary storage locations in the primary storage 10a and corresponding secondary storage locations in each of the secondary storage drives as represented by the storage 10b of the mirror relationship, such that updates to locations of the primary storage 10a are mirrored, that is, copied to the corresponding locations of the secondary storage 10b. For example, source storage locations in a primary storage volume1 (FIG. 1) of storage 10a may be asynchronously mirrored in a mirror operation to target storage locations of a secondary volume2 of the storage 10b pursuant to a mirror copy relationship 30 (FIG. 2). Similarly, source storage locations in the primary storage volume1 (FIG. 3) of storage 10a may be asynchronously mirrored in a mirror operation to additional target storage locations of another secondary volume2 of another secondary data storage system pursuant to a mirror copy relationship 30 (FIG. 2).

In the illustrated embodiment, a copy relationship 30 comprises an asynchronous mirror relationship for a pair of storage locations in which updates to the primary (source) storage locations of the mirror relationship 30 are asynchronously mirrored to the secondary (target) storage locations of the mirror relationship 30. It is appreciated that other types of copy relationships such as synchronous, for example, may be established, depending upon the particular application.

In the configuration illustrated in FIG. 1, the storage controller 4a and the data storage 10a have been configured as a primary storage control unit and the primary storage, respectively, of a primary data storage system 2a. Similarly, the storage controller 4b and its data storage 10b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage 10a will be referred to as a primary storage 10a. Similarly, the storage controller or control unit 4b will be referred to as a secondary storage controller or control unit 4b and the data storage 10b will be referred to as a secondary data storage 10b. In this embodiment, there may be multiple secondary data storages such that a copy relation can be in a one to many relationship, which is also referred to as a multi-target relationship.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

Figure 3:
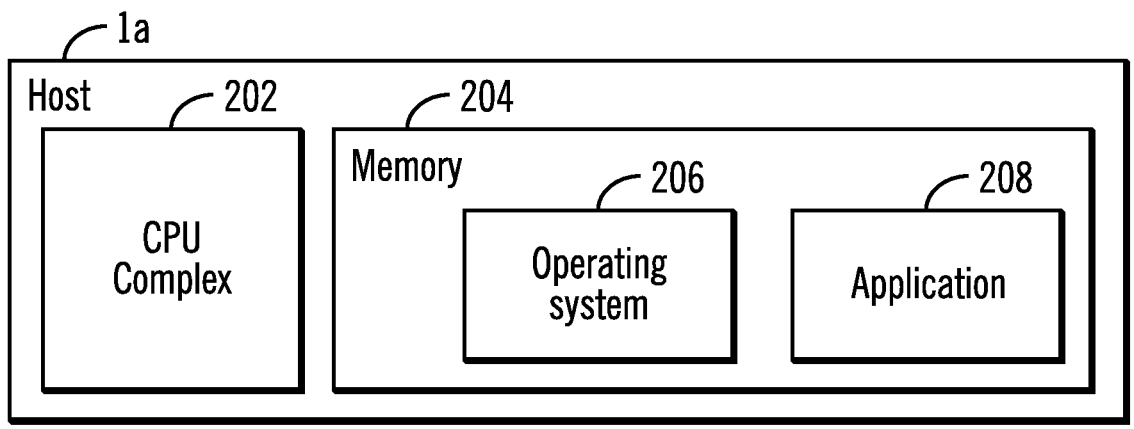
FIG. 3 illustrates an example of a host of the computing environment of FIG. 1.

A typical host as represented by the host 1a of FIG. 3 includes a CPU complex 202 and a memory 204 having an operating system 206 and an application 208 that cooperate to read data from and write data updates to the storage 10a, 10b via a storage controller 4, 4a, 4b. An example of a suitable operating system is the z/OS operating system. It is appreciated that other types of operating systems may be employed, depending upon the particular application.

Figure 4:
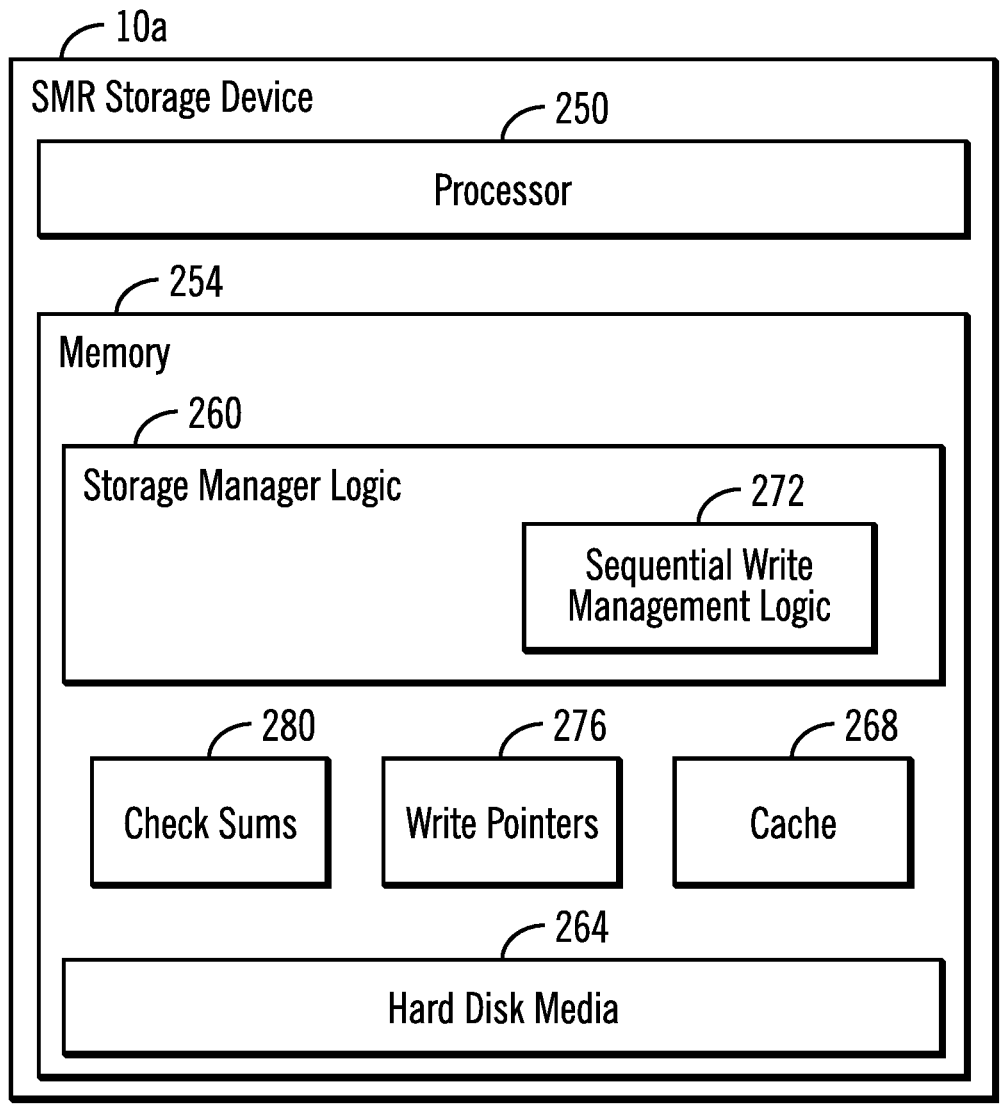
FIG. 4 illustrates an example of a data storage device of the computing environment of FIG. 1, employing sequential write management in accordance with one aspect of the present description.

FIG. 4 depicts an example of a data storage device 10a employing sequential write management in accordance with one embodiment of the present description. In this embodiment, the data storage device 10a is an SMR hard disk drive but it is appreciated that sequential write management in accordance with the present description may be employed in other memory and data storage devices having similar restrictive storage protocols. It is further appreciated that sequential write management in accordance with the present description may be employed in memory and storage devices such as flash memory and solid state drives, for example, which may permit retry write operations but nonetheless may benefit by reducing or avoiding wear of duplicate writes. The storage device 10a of FIG. 4 is also representative of an SMR data storage device 10b of a secondary storage system.

The data storage device 10a of FIG. 4 includes a processor 250 which may have in one embodiment, one or more central processing units (CPUs), each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each data storage device 10a further has a memory 254 that includes storage manager logic 260 configured to manage storage operations directed to hard disk media 264 including writing data to or reading data from the hard disk media 264 in response to an I/O data request from the storage controller controlling the data storage device 10a. The I/O data request may have originated from a host or from another data storage system in connection with a mirroring operation, for example. A cache 268 of the memory 254 may comprise one or more of different types of memory, such as RAMs, write caches, read caches, non-volatile storage (NVS), etc. The different types of memory that comprise the cache may interoperate with each other. The processing and memory resources of each data storage device 10a, 10b may be physical, virtual, shared, transferrable or dedicated, depending upon the particular application.

As explained in greater detail below, in accordance with one aspect of sequential write management of the present description, the storage manager logic 260 further includes sequential write management logic 272 which utilizes write pointers 276 and checksums 280 to detect when the source of an I/O request is retrying a previous write operation. If the sequential write management logic 272 detects that the data to be re-written is already present on disk 264, instead of returning an error notice of a violation of the storage protocol against write retry operations, the SMR hard drive indicates successful completion to the host or other I/O request source without actually re-writing the data. As a consequence, the I/O request source deems the write retry request to be satisfied and the SMR drive can bypass the sending of an error message. In this manner, the I/O request source can use the same error recovery mechanisms for network errors, regardless of whether the data storage device is an SMR drive or a non-SMR drive.

In the illustrated embodiment, the storage manager logic 260 including the sequential write management logic 272 is depicted as software stored in the memory 254 and executed by the processor 250. However, it is appreciated that the logic functions of the storage manager 260 or the sequential write management logic 272 may be implemented as hardware, software, firmware or combinations of one or more thereof, depending upon the particular application. For example, one or more logic functions of the storage manager logic 260 or the sequential write management logic 272 may be implemented in a software driver such as the driver 25 (FIG. 2) of the storage controller 4.

Figure 5:
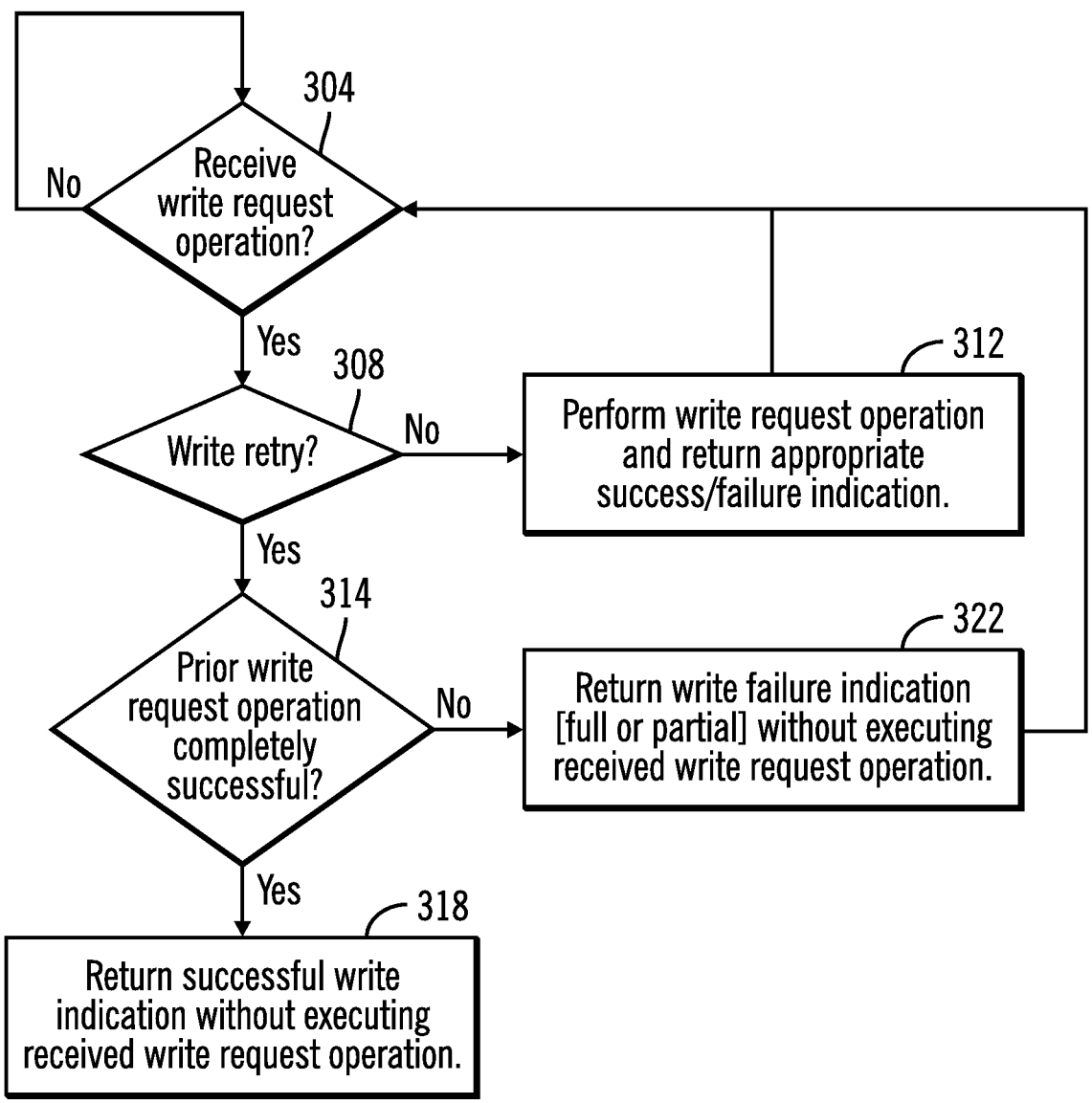
FIG. 5 illustrates an example of operations of a data storage device of the computing environment of FIG. 1, employing sequential write management in accordance with one aspect of the present description.
Figure 6A:
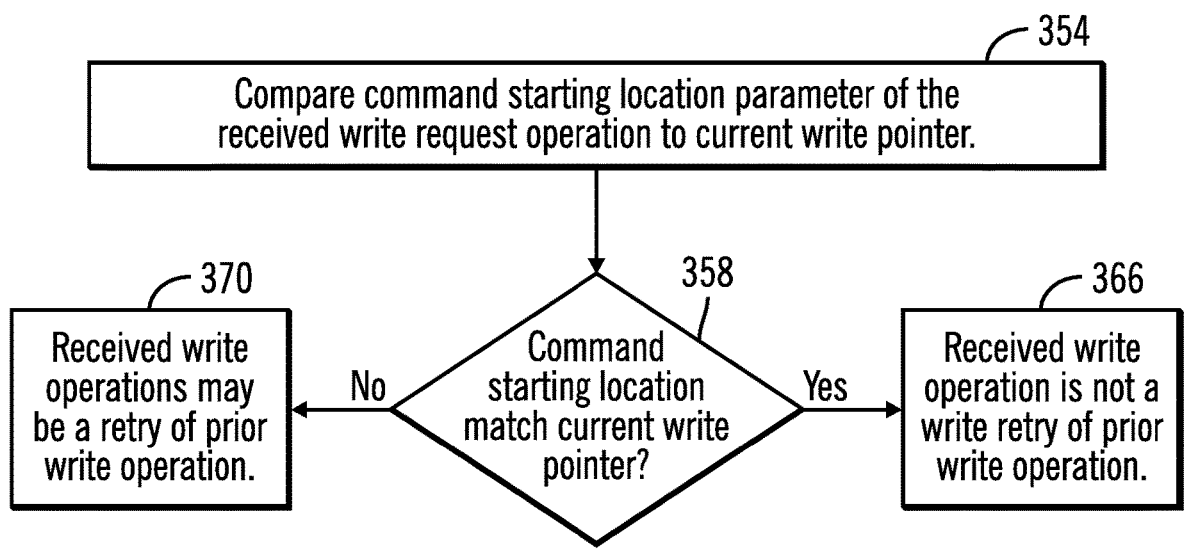
Figure 6B:
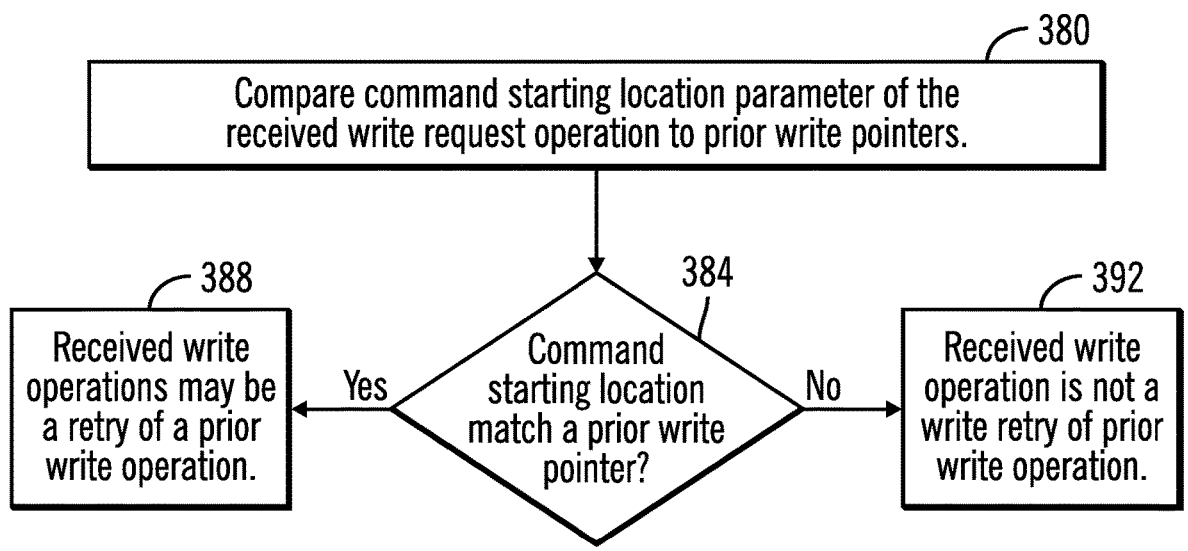

FIG. 5 depicts an example of operations of the storage manager logic 260 and its sequential write management logic 272 to process write retry operations without violating the storage protocol of SMR drives which prohibit executing rewriting of data already written. In this example, upon receipt (block 304, FIG. 5) of a write request operation from an I/O operation source such as a host via a storage controller, the sequential write management logic 272 is configured to perform various operations including determining (block 308) whether the received write request operation directed to the SMR drive is a write retry operation. FIGS. 6A-6B depict more detailed examples of operations by the sequential write management logic 272 to determine whether the received write request operation directed to the SMR drive is a write retry operation. If the sequential write management logic 272 determines (block 308) that the received (block 304) write request operation is not a write retry operation, the sequential write management logic 272 causes the storage manager logic 260 to perform (block 312) the received write operation in the usual manner and return an appropriate success/failure indication to the I/O operation requestor or source. Thus, if the SMR drive successfully executes the received write operation by successfully writing the requested data to the requested location of the hard disk media 264 (FIG. 4) as requested by the received write request, the SMR drive returns (block 312, FIG. 5) a "write successful" indication to the I/O operation requestor, typically via the storage controller. Conversely, if the SMR drive fails to successfully execute the received write operation and thus fails to successfully write the requested data to the requested location of the hard disk media 264 (FIG. 4) as requested by the received write request, the SMR drive returns (block 312, FIG. 5) a "write failure" indication to the I/O operation requestor, again typically via the storage controller.

Figure 7:
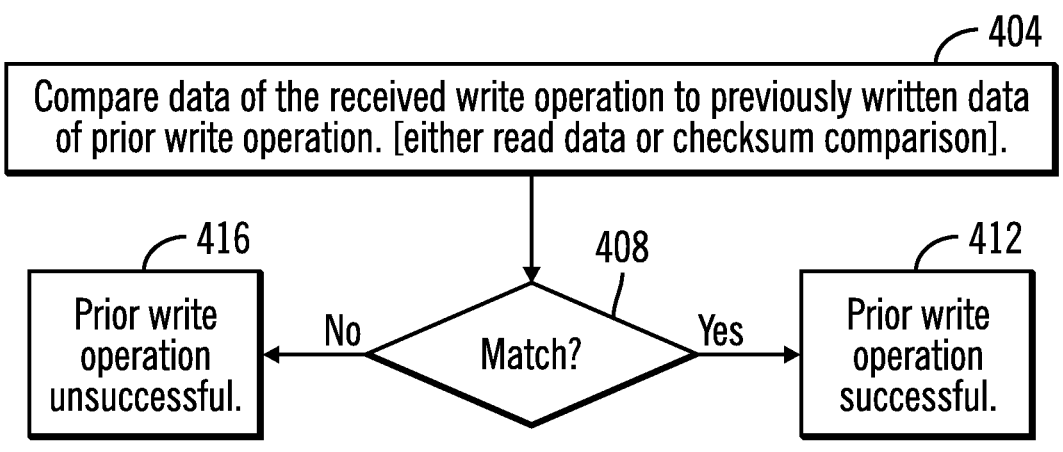
FIGS. 6A, 6B and 7 illustrate more detailed examples of operations of a data storage device of the computing environment of FIG. 1, employing sequential write management in accordance with one aspect of the present description.

If the sequential write management logic 272 determines (block 308) that the currently received (block 304) write request operation is a write retry operation of a previously received write operation, the sequential write management logic 272 is further configured to determine (block 314) whether the prior received write operation was successful, that is, whether the SMR drive successfully executed the prior received write request operation by successfully writing the requested data to the requested location of the hard disk media 264 (FIG. 4) as requested by the prior received write request. FIG. 7 depicts a more detailed example of operations by the sequential write management logic 272 to determine whether the received write request operation directed to the SMR drive was successfully completed.

The sequential write management logic 272 is further configured to return (block 318, FIG. 5) a successful write indication in response to the received write request operation in response to a determination (block 314) that the SMR drive successfully executed the prior received write request operation by successfully writing the requested data to the requested location of the hard disk media 264 (FIG. 4) as requested by the prior received write request. The successful write indication is returned without actually executing the writing of data requested by the current received write request. Thus, the sequential write management logic 272 is further configured to bypass execution of the current received write operation when returning an indication that that the current write operation was successful. In this manner, a prohibited rewrite operation is avoided and the I/O requestor that sent the current write operation is nonetheless satisfied by the returning of the successful write indicator by the SMR drive. As a result, the I/O requestor will stop requesting a retry of the write operation since it is informed of the successful execution of the write operation notwithstanding that the execution of the current write operation was bypassed upon the determination that the prior write request was already successfully executed. In addition, no modifications of the error handling routines of the I/O requestor are necessitated by the restrictions against write retries of the storage protocol of an SMR drive.

Conversely, the sequential write management logic 272 is further configured to return (block 322, FIG. 5) a write failure indication in response to the current received write request operation should it be determined (block 314) that the SMR drive failed to successfully execute the prior received write request operation. Thus in this example, it is determined (block 314) that the SMR drive failed to write the requested data to the requested location of the hard disk media 264 (FIG. 4) as requested by the prior received write request.

Here too, The write failure indication is returned without actually attempting to execute the writing of data requested by the current received write request. Thus, the sequential write management logic 272 is further configured to bypass execution of the current received write operation when returning an indication that that the current received write operation failed. In this manner, a prohibited rewrite operation is again avoided and the I/O requestor that sent the current write operation is informed by the returning of the write failure indicator by the SMR drive. As a result, the I/O requestor will stop requesting a retry of the write operation since it is informed of the failed execution of the current write operation notwithstanding that an attempt to execute the current write operation by writing data was bypassed upon the determination that the initial write request resulted in a failure. Upon receipt of the write failure notice, the I/O requestor can elect to send another write request but directed to the next-in-sequence location of the SMR drive which will be permitted by the SMR storage protocol because it is not a rewrite operation directed to a previously written location. Here too, it is noted that no modifications of the error handling routines of the I/O requestor are necessitated by the restrictions against write retries of the storage protocol of an SMR drive.

FIG. 6A depicts a more detailed example of operations by the sequential write management logic 272 to determine (block 308, FIG. 5) whether the received write request operation directed to the SMR drive is a write retry operation. In this example, a received write operation includes a command starting location parameter indicating a starting location in the SMR data storage for the received write operation and a command count parameter indicating a number of sequential locations in the data storage in which the data of the received write operation is to be written. Thus, the host may have initially requested a write of 8 sequential blocks of data, for example, to a starting location in the form of a logical block address such as "1234" (FIG. 8A), for example, which is mapped to a corresponding storage location in a zone of an SMR drive attached to the storage controller. The initial write request includes or references the 8 blocks of data to be sequentially written.

Figure 8A:
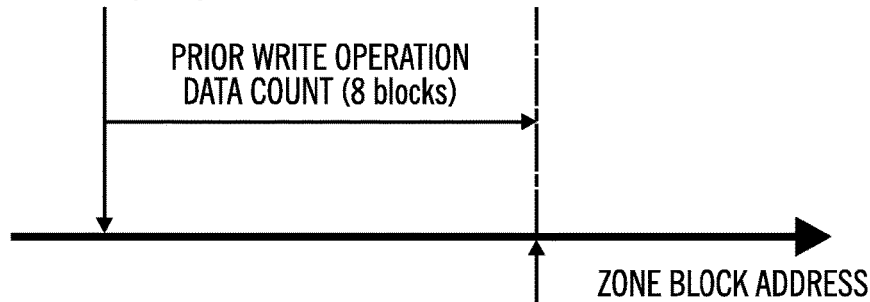

In this example, the storage manager logic 260 (FIG. 4) is further configured to maintain a write pointer which provides an indication of at least one of a location in data storage in which a previous write operation ended and a location in data storage in which a next write operation is to start. Accordingly, upon receipt of the prior write request operation, the write pointer of the SMR drive contained a value representing the initial logical block address "1234" in the example of FIG. 8A. Thus, the write pointer indicated that the next write operation was to start at block address 1234 of the zone of the SMR drive. Upon successful completion of the prior received write request for the writing of the 8 sequential blocks of data, starting at the starting storage location "1234" of the zone of the SMR drive, the SMR drive incremented the write pointer for that zone to point to the next-in-sequence storage location "1242" (1234+8=1242), having sequentially written eight blocks of data to the previous eight sequential block addresses 1234, 1235 . . . 1241. Thus, following the completion of the execution of the prior write request operation, the current write pointer value indicates that the next write operation is to start at block address 1242 of the zone of the SMR drive as shown in FIG. 8A.

The sequential write management logic 272 (FIG. 4) is further configured to determine whether the received write operation is a retry write operation of a previous write operation to write the same data to the same location of the previous write operation, as a function of a comparison (block 354. FIG. 6A) of the command starting location parameter of the received write operation to a maintained write pointer. In one embodiment, the sequential write management logic is further configured to determine whether the command starting location parameter-of the received write operation matches (block 358, FIG. 6A) the current write pointer of the open zone of the received write operation. If the command starting location parameter of the received write operation matches the current value of the write pointer of the open zone of the received write operation, the received write request operation is deemed (block 366, FIG. 6A) to not be a retry of a previous executed write operation. In the example of FIG. 8A, the current received write request command has a starting location parameter defining the starting storage location of the current write request operation as block address "1242" which matches the current value "1242" of the write pointer of the open zone of the received write operation. Accordingly, the received write request operation is deemed (block 366, FIG. 6A) to not be a retry of a previous executed write operation and the current received write request operation is performed (block 312, FIG. 5), and the appropriate success/failure indication is returned, depending upon whether the current received write request operations was successfully executed.

Figure 8B:
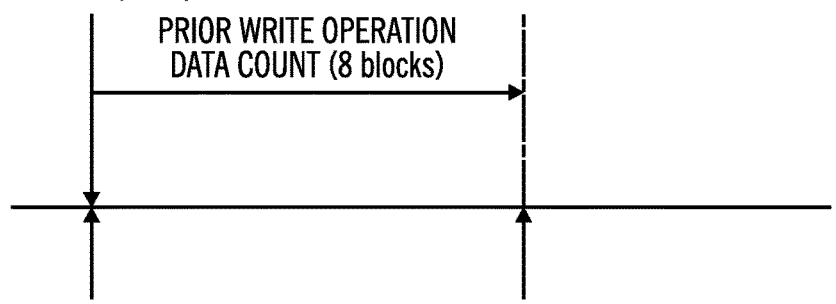

In the example of FIG. 8B, the current received write request command has a starting location parameter defining the starting storage location of the current write request operation as block address "1234" which does not match the current value "1242" of the write pointer of the open zone of the received write operation. Accordingly, the received write request operation is deemed (block 370, FIG. 6A) to possibly be a retry of a previous executed write operation and a determination (block 314, FIG. 5) is made as to whether the prior write request operation was completed successfully as discussed above in connection with FIG. 5.

Figure 8C:
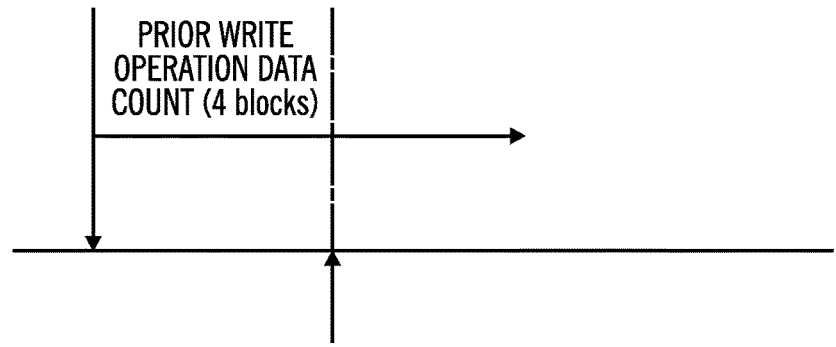

In the example of FIG. 8C, the prior write request operation was interrupted for some reason and as a result, wrote only 4 blocks of data instead of the full 8 blocks of data the prior received write request. Accordingly, the write pointer was incremented by 4 to the current value of 1238 in the example of FIG. 8C instead of the current pointer value of 1242 in the examples of FIGS. 8A and 8B. In the example of FIG. 8C, the command of the currently received write request operation again has a starting location parameter defining the starting storage location of the current write request operation as block address "1234" which does not match the current value "1238" of the write pointer of the open zone of the received write operation. Accordingly, the received write request operation is again deemed (block 370, FIG. 6A) to possibly be a retry of a previous executed write operation and a determination (block 314, FIG. 5) is made as to whether the prior write request operation was completely successful as discussed above in connection with FIG. 5.

In another embodiment, the sequential write management logic is further configured to determine whether the received write operation is a retry write operation of a previous write operation to write the same data to the same location of the previous write operation in an open zone as a function of a comparison (block 380, FIG. 6B) of the command starting location parameter of the received write operation and a prior write pointer for a previously executed write operation in the open zone of the received write operation. In this embodiment, the sequential write management logic is configured to maintain for each open zone of the SMR drive, a stored value representing the past value of the write pointer for the immediately prior write operation and in some embodiments, for one or more additional prior write operations executed in the zone of the currently received write operation. As described below, maintaining a record of past write pointer values provides the ability to tolerate retries of more than just the most recent executed write operation.

Thus, the sequential write management logic determines whether the command starting location parameter of the currently received write request operation matches (block 384, FIG. 6B) a prior write pointer for a previously executed write operation in the open zone of the received write operation. If the command starting location parameter of the received write operation matches the value of a prior write pointer of the open zone of the received write operation, the received write request operation is deemed (block 388, FIG. 6B) to possibly be a retry of a previous executed write operation. Thus, the ability is provided to detect retries of more than one prior write request and even partially successful prior write operations. Conversely, if the command starting location parameter of the received write operation does not match the value of any stored prior write pointer of the open zone of the received write operation, the received write request operation is deemed (block 392, FIG. 6B) to not be a retry of a previous executed write operation, whether the previous executed write operation was fully or partially successful.

In the example of FIG. 9A, the current received write request command has a starting location parameter defining the starting storage location of the current write request operation as block address "1242" which does not match the prior value "1234" (or any prior value) of the write pointer of the open zone of the received write operation. Accordingly, the received write request operation is deemed (block 392, FIG. 6B) to not be a retry of any previous executed write operation and the current received write request operation is performed (block 312, FIG. 5), and the appropriate success/failure indication is returned, depending upon whether the current received write request operations was successfully executed.

In the example of FIG. 9B, the current received write request command again has a starting location parameter defining the starting storage location of the current write request operation as block address "1234" which does match the prior value of the write pointer for a prior executed write operation, which is the write pointer value of "1234" which may be the immediately prior executed write operation or an earlier write operation executed in the open zone of the currently received write operation. Accordingly, the currently received write request operation is deemed (block 388, FIG. 6B) to possibly be a retry of a previous executed write operation and a determination (block 314, FIG. 5) is made as to whether the prior write request operation was completely successful as discussed above in connection with FIG. 5.

In the example of FIG. 9C, the prior write request operation was interrupted for some reason and as a result, wrote only 4 blocks of data instead of the requested full 8 blocks of data a prior received write request. Accordingly, the write pointer was incremented by 4 to the current value of 1238 in the example of FIG. 9C instead of the current pointer value of 1242 in the examples of FIGS. 9A and 9B. In the example of FIG. 9C, the command of the currently received write request operation again has a starting location parameter defining the starting storage location of the current write request operation as block address "1234" which again matches one of the maintained prior write pointer values, value "1234" in this example, for write operations previously executed for the open zone of the currently received write operation. Accordingly, the received write request operation is again deemed (block 388, FIG. 6B) to possibly be a retry of a previous executed write operation and a determination (block 314, FIG. 5) is made as to whether the prior write request operation was completely successful as discussed above in connection with FIG. 5.

Thus, the ability is provided to detect retries of various prior and partially successful prior write operations. Conversely, if the command starting location parameter of the received write operation does not match the value of any stored prior write pointer of the open zone of the received write operation, the received write request operation is deemed (block 392, FIG. 6B) to not be a retry of a previous executed write operation, whether the previous executed write operation was fully or partially successful.

FIG. 7 depicts a more detailed example of operations by the sequential write management logic 272 to determine whether a received write request operation directed to the SMR drive was previously successfully completed. As noted above, if the data of a previous write operation has been successfully written to the same location requested by the currently received write operation, the sequential write management logic 272 returns a successful write notification in response to the concurrently received write request operation notwithstanding that the execution of the currently received write operation is bypassed so as not to write the data requested by the currently received write operation. Conversely, in response to a determination that the data of a previous write operation has not been previously successfully written to the requested location of the currently received write operation, the sequential write management logic returns a write failure indication in response to the currently received write operation, again without executing the currently received write operation. Thus, in either case, the sequential write management logic bypasses execution of data writing requested by the received write operation because a write retry request of an earlier executed write operation violates the storage protocol of the SMR drive. However, by providing a success/failure notification in response to the currently received write request operation instead of executing the currently received write request operation, the existing error handling routines of an I/O requestor such as a host may be utilized without modification to accommodate the storage protocols of SMR drives.

In the illustrated embodiment, the sequential write management logic is further configured to determine if the data of the previous write operation has previously been successfully written to the requested location of the currently received write operation, by comparing (block 404, FIG. 7) data written by a previous write operation, to the requested write data of the currently received write request operation. For example, the sequential write management logic is further configured to determine if the previously written data matches (block 408, FIG. 7), that is, is identical to the write data of the received write operation. If so, the prior write operation is deemed to be successful (block 412, FIG. 7).

Conversely, if the sequential write management logic determines that the previously written data does not match (block 408, FIG. 7), that is, is not identical to the write data of the received write operation, the prior write operation is deemed to be unsuccessful (block 416, FIG. 7). As described above in connection with FIG. 5, the sequential write management logic returns (block 318, FIG. 5) a successful write indication without executing the received write operation if the previously written data is determined to be identical to the write data of the received write operation, and returns (block 322, FIG. 5) a write failure indication, again without executing the received write operation, if the previously written data is not determined to be identical to the write data of the received write operation.

In one embodiment, the data written by a previous write operation may be obtained for the comparison to the requested write data of the currently received write request operation by reading the previously written data stored in the SMR drive and comparing the read data to the requested write data of the currently received write request operation. In another embodiment, a received write request operation includes a checksum parameter for the write data of the received write operation. In such embodiments, the sequential write management logic is configured to maintain for a previous write operation a checksum for previously written data of the previous write operation and compare the checksum for previously written data of the previous write operation to the checksum parameter of the received write operation. The checksum for each prior write operation may be stored in cache or on the hard disk media of the SMR drive, as appropriate. In some embodiments, the SMR drive may compute a checksum as the write data flows in to the drive so that the I/O requestor need not supply a checksum parameter with the write request operation. It is appreciated that other techniques may be used for successful write verification such as a strong hash function comparison to improve reliability of the verification.

The storage manager 24 (FIG. 2) in one embodiment stores data in the cache and transfers data between the cache and storage 10a, 10b (FIG. 1) in tracks. Similarly, the storage manager 24 (FIG. 2) in one embodiment transfers data from the primary storage 10a (FIG. a) to a secondary storage 10b in tracks. As used herein in one embodiment, the term track refers to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in input/output operations in accordance with the present description may vary, depending upon the particular application. Thus, as used herein, the term "track" or the term "segment" refers to any suitable subunit of data storage or transfer.

The system components 1a (FIG. 1), 1b . . . 1n, 4 (FIG. 2), 6 are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 10:
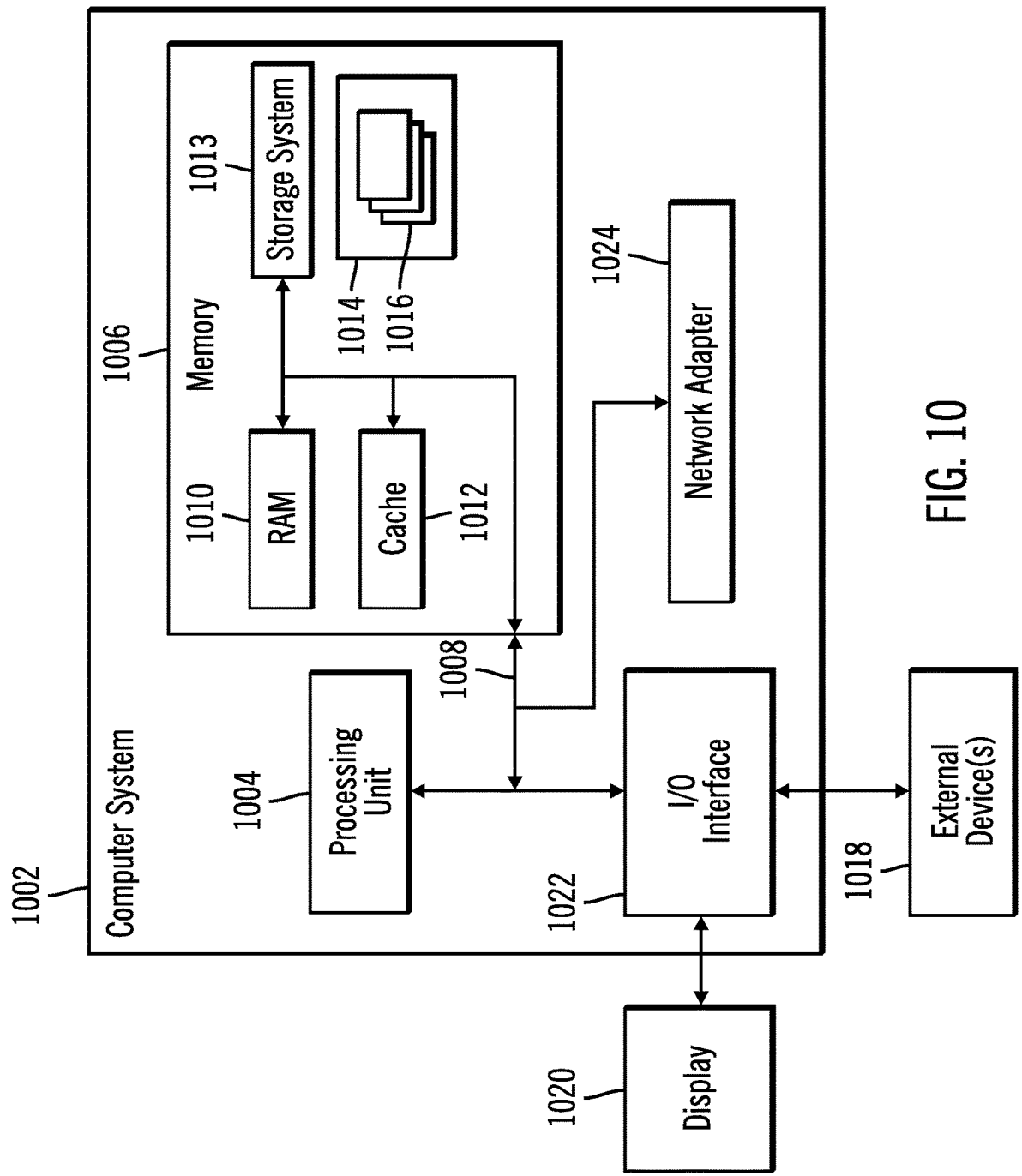
FIG. 10 illustrates a computer embodiment employing sequential write management in a data storage system in accordance with the present description.

The computational components of the figures may each be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A system, comprising:
a data storage system having a storage controller and at least one storage unit controlled by the storage controller and configured to store data in the primary volume, wherein the storage unit has a processor; and
a computer program product comprising a computer readable storage medium having program instructions embodied therewith, the program instructions executable by a processor of the storage unit to cause storage unit processor operations, the storage unit processor operations comprising:
receiving a write request operation to write data to a location in the storage unit;
determining whether the received write request operation is a retry write request operation of a previous write request operation to write to the same location of the previous write request operation;
in response to a determination that the received write request operation is a retry write request operation of a previous write request operation, determining if the data of the previous write request operation has previously been successfully written to the same location of the received write request operation; and
in response to a determination that the data of the previous write request operation has been successfully written to the same location of the received write request operation, bypassing execution of the received write request operation and returning a successful write indication in response to the received write request operation without executing the received write request operation.

2. The system of claim 1 wherein the storage unit processor operations further comprise in response to a determination that the data of the previous write request operation has not been previously successfully written to the same location of the received write request operation, bypassing execution of the received write request operation and returning a write failure indication in response to the received write request operation without executing the received write request operation.

3. The system of claim 1 wherein the received write request operation includes a command starting location parameter indicating a starting location in the data storage for the received write request operation and a command count parameter indicating a number of locations in the data storage in which the data of the received write request operation is to be written, and wherein the storage unit processor operations further comprise:

maintaining a write pointer which provides an indication of at least one of a location in data storage in which a previous write request operation started and a location in data storage in which a next write request operation is to start; and wherein the determining whether the received write request operation is a retry write request operation of a previous write request operation to write the same data to the same location of the previous write request operation, is a function of a comparison of the command starting location parameter of the received write request operation to a maintained write pointer.

4. The system of claim 2 wherein the determining if the data of the previous write request operation has previously been successfully written to the same location of the received write request operation, includes reading data written by the previous write request operation and comparing the read data to the write data of the received write request operation.

5. The system of claim 4 wherein comparing the read data to the write data of the received write request operation includes determining if the read data is identical to the write data of the received write request operation wherein a successful write indication is returned without executing the received write request operation if the read data is determined to be identical to the write data of the received write request operation, and wherein a write failure indication is returned without executing the received write request operation if the read data is determined not to be identical to the write data of the received write request operation.

6. The system of claim 3 wherein the data storage unit is configured to maintain a plurality of open zones of storage locations and the received write request operation is a write request operation to write data to a location in an open zone of the data storage, wherein the storage unit processor operations further comprise maintaining for each open zone, an associated write pointer which provides an indication of a starting location in the associated open zone in which a previous write request operation was performed in the associated open zone;

wherein the received write request operation is determined to be a retry write request operation of a previous write request operation to write the same data to the same location of the previous write request operation in an open zone if the command starting location parameter matches a maintained write pointer of the open zone of the received write request operation.

7. The system of claim 3 wherein the data storage unit is configured to maintain a plurality of open zones of storage locations, the system further comprising maintaining for each open zone, a plurality of write pointers associated with a plurality of previous write request operations to an associated open zone, each write pointer providing an indication of a starting location in the associated open zone in which a previous write request operation of the plurality of previous write request operations wrote data; and determining whether the received write request operation is a retry write request operation of one of the plurality of previous write request operation of an open zone to write the same data to the same starting location of a previous write request operation of the plurality of previous write request operations to an associated open zone.

8. The system of claim 2 wherein the received write request operation includes a checksum parameter for the write data of the received write request operation, and wherein determining if the data of the previous write request operation has previously been successfully written to the same location of the received write request operation, includes maintaining for a previous write request operation a checksum for previously written data of the previous write request operation and comparing the checksum for previously written data of the previous write request operation to the checksum parameter of the received write request operation.

9. A method, comprising:

receiving a write request operation to write data to a location in data storage;

determining whether the received write request operation is a retry write request operation of a previous write request operation to write to the same location of the previous write request operation;

in response to a determination that the data of the received write request operation is a retry write request operation of a previous write request operation, determining if the data of the previous write request operation has previously been successfully written to the same location of the received write request operation; and in response to a determination that the data of the previous write request operation has been successfully written to the same location of the received write request operation, bypassing execution of the received write request operation and returning a successful write indication in response to the received write request operation without executing the received write request operation.

10. The method of claim 9 further comprising in response to a determination that the data of the previous write request operation has not been previously successfully written to the same location of the received write request operation, bypassing execution of the received write request operation and returning a write failure indication in response to the received write request operation without executing the received write request operation.

11. The method of claim 9 wherein the received write request operation includes a command starting location parameter indicating a starting location in the data storage for the received write request operation and a command count parameter indicating a number of locations in the data storage in which the data of the received write request operation is to be written, the method further comprising:

maintaining a write pointer which provides an indication of at least one of a location in data storage in which a previous write request operation started and a location in data storage in which a next write request operation is to start; and wherein the determining whether the received write request operation is a retry write request operation of a previous write request operation to write the same data to the same location of the previous write request operation, is a function of a comparison of the command starting location parameter of the received write request operation to a maintained write pointer.

12. The method of claim 10 wherein the determining if the data of the previous write request operation has previously been successfully written to the same location of the received write request operation, includes reading data written by the previous write request operation and comparing the read data to the write data of the received write request operation.

13. The method of claim 12 wherein comparing the read data to the write data of the received write request operation includes determining if the read data is identical to the write data of the received write request operation wherein a successful write indication is returned without executing the received write request operation if the read data is determined to be identical to the write data of the received write request operation, and wherein a write failure indication is returned without executing the received write request operation if the read data is not determined to be identical to the write data of the received write request operation.

14. The method of claim 11 wherein the data storage unit is configured to maintain a plurality of open zones of storage locations and the received write request operation is a write request operation to write data to a location in an open zone of the data storage, the method further comprising maintaining for each open zone, an associated write pointer which provides an indication of a starting location in the associated open zone in which a previous write request operation was performed in the associated open zone;
   wherein the received write request operation is determined to be a retry write request operation of a previous write request operation to write the same data to the same location of the previous write request operation in an open zone if the command starting location parameter matches a maintained write pointer of the open zone of the received write request operation.

15. The method of claim 11 wherein the data storage unit is configured to maintain a plurality of open zones of storage locations, the method further comprising maintaining for each open zone, a plurality of write pointers associated with a plurality of previous write request operations to an associated open zone, each write pointer providing an indication of a starting location in the associated open zone in which a previous write request operation of the plurality of previous write request operations wrote data; and
   determining whether the received write request operation is a retry write request operation of one of the plurality of previous write request operation of an open zone to write the same data to the same location of a previous write request operation of the plurality of previous write request operations to an associated open zone.

16. The method of claim 10 wherein the received write request operation includes a checksum parameter for the write data of the received write request operation, and wherein determining if the data of the previous write request operation has previously been successfully written to the same location of the received write request operation, includes maintaining for a previous write request operation a checksum for previously written data of the previous write request operation and comparing the checksum for previously written data of the previous write request operation to the checksum parameter of the received write request operation.

17. A computer program product for use with, a data storage system having a storage controller and at least one storage unit controlled by the storage, wherein the storage unit has a processor, and wherein the computer program product comprises a computer readable storage medium having program instructions embodied therewith, the program instructions executable by a processor of the storage unit to cause storage controller processor operations, the storage unit processor operations comprising:
   receiving a write request operation to write data to a location in the storage unit;
   determining whether the received write request operation is a retry write request operation of a previous write request operation to write to the same location of the previous write request operation;
   in response to a determination that the received write request operation is a retry write request operation of a previous write request operation, determining if the data of the previous write request operation has previously been successfully written to the same location of the received write request operation; and
   in response to a determination that the data of the previous write request operation has been successfully written to the same location of the received write request operation, bypassing execution of the received write request operation and returning a successful write indication in response to the received write request operation without executing the received write request operation.

18. The computer program product of claim 17 wherein the storage unit processor operations further comprise in response to a determination that the data of the previous write request operation has not been previously successfully written to the same location of the received write request operation, bypassing execution of the received write request operation and returning a write failure indication in response to the received write request operation without executing the received write request operation.

19. The computer program product of claim 17 wherein the received write request operation includes a command starting location parameter indicating a starting location in the data storage for the received write request operation and a command count parameter indicating a number of locations in the data storage in which the data of the received write request operation is to be written, and wherein the storage unit processor operations further comprise:
   maintaining a write pointer which provides an indication of at least one of a location in data storage in which a previous write request operation started and a location in data storage in which a next write request operation is to start; and
   wherein the determining whether the received write request operation is a retry write request operation of a previous write request operation to write the same data to the same location of the previous write request operation, is a function of a comparison of the command starting location parameter of the received write request operation to a maintained write pointer.

20. The computer program product of claim 18 wherein the determining if the data of the previous write request operation has previously been successfully written to the same location of the received write request operation, includes reading data written by the previous write request operation and comparing the read data to the write data of the received write request operation.

21. The computer program product of claim 20 wherein comparing the read data to the write data of the received write request operation includes determining if the read data is identical to the write data of the received write request operation wherein a successful write indication is returned without executing the received write request operation if the read data is determined to be identical to the write data of the received write request operation, and wherein a write failure indication is returned without executing the received write request operation if the read data is determined not to be identical to the write data of the received write request operation.

22. The computer program product of claim 19 wherein the data storage unit is configured to maintain a plurality of open zones of storage locations and the received write request operation is a write request operation to write data to a location in an open zone of the data storage, wherein the storage unit processor operations further comprise maintaining for each open zone, an associated write pointer which provides an indication of a starting location in the associated open zone in which a previous write request operation was performed in the associated open zone;

wherein the received write request operation is determined to be a retry write request operation of a previous write request operation to write the same data to the same location of the previous write request operation in an open zone if the command starting location parameter matches a maintained write pointer of the open zone of the received write request operation.

23. The computer program product of claim 19 wherein the data storage unit is configured to maintain a plurality of open zones of storage locations, wherein the storage unit processor operations further comprise:

maintaining for each open zone, a plurality of write pointers associated with a plurality of previous write request operations to an associated open zone, each write pointer providing an indication of a starting location in the associated open zone in which a previous write request operation of the plurality of previous write request operations wrote data; and determining whether the received write request operation is a retry write request operation of one of the plurality of previous write request operation of an open zone to write the same data to the same starting location of a previous write request operation of the plurality of previous write request operations to an associated open zone.

24. The computer program product of claim 18 wherein the received write request operation includes a checksum parameter for the write data of the received write request operation, and wherein determining if the data of the previous write request operation has previously been successfully written to the same location of the received write request operation, includes maintaining for a previous write request operation a checksum for previously written data of the previous write request operation and comparing the checksum for previously written data of the previous write request operation to the checksum parameter of the received write request operation.

* * * * *